United States Patent [19]

Joubert

[11] 4,074,788
[45] Feb. 21, 1978

[54] TRACTOR DOOR LATCH

[75] Inventor: Jerauld D. Joubert, Argusville, N. Dak.

[73] Assignee: Steiger Tractor Inc., Fargo, N. Dak.

[21] Appl. No.: 712,856

[22] Filed: Aug. 9, 1976

[51] Int. Cl.² ............................................. E05C 3/04
[52] U.S. Cl. .................................. 180/89.12; 292/218; 292/259 R; 296/28 C; 49/246; 49/142; 16/85
[58] Field of Search ............... 292/338, 339, 216, 213, 292/218, 202, 342, DIG. 15

[56] References Cited

U.S. PATENT DOCUMENTS

| | | | |
|---|---|---|---|
| 1,347,229 | 7/1920 | Richardson | 292/230 |
| 1,626,422 | 4/1927 | Mutispaugh | 292/216 |
| 3,353,857 | 11/1967 | Mongor | 292/DIG. 15 |

FOREIGN PATENT DOCUMENTS

| | | | |
|---|---|---|---|
| 1,358,603 | 7/1974 | United Kingdom | 292/DIG. 15 |

Primary Examiner—Richard E. Moore
Attorney, Agent, or Firm—Frederick E. Lange

[57] ABSTRACT

A yieldable door latch for holding open the door of a tractor cab in which the fender adjacent the door is of a width comparable to the width of the door, the door latch being mounted adjacent the outer edge of the fender so as to engage the under side of the door at a point close to the outer edge of the door. The door latch has biasing means located beneath the fender for biasing the door latch upwardly and has two inclined surfaces inclined upwardly from the outer and inner ends of the latching member to a central notch which is designed to receive the lower edge of the door. This biasing means is located beneath the fender and has an adjustable stop for limiting the upward movement of the latching member so that the outer end of the latching member always lies beneath the path of the lower edge of the door.

The latching member preferably extends generally parallel to the outer edge of the fender and has a downwardly extending flange extending down beside the outer edge so as to guide the movement of the latching member. The latching member is provided with a flat portion to be engaged by the foot to enable the latching member to be pushed down to release the door.

9 Claims, 4 Drawing Figures

U.S. Patent    Feb. 21, 1978    4,074,788
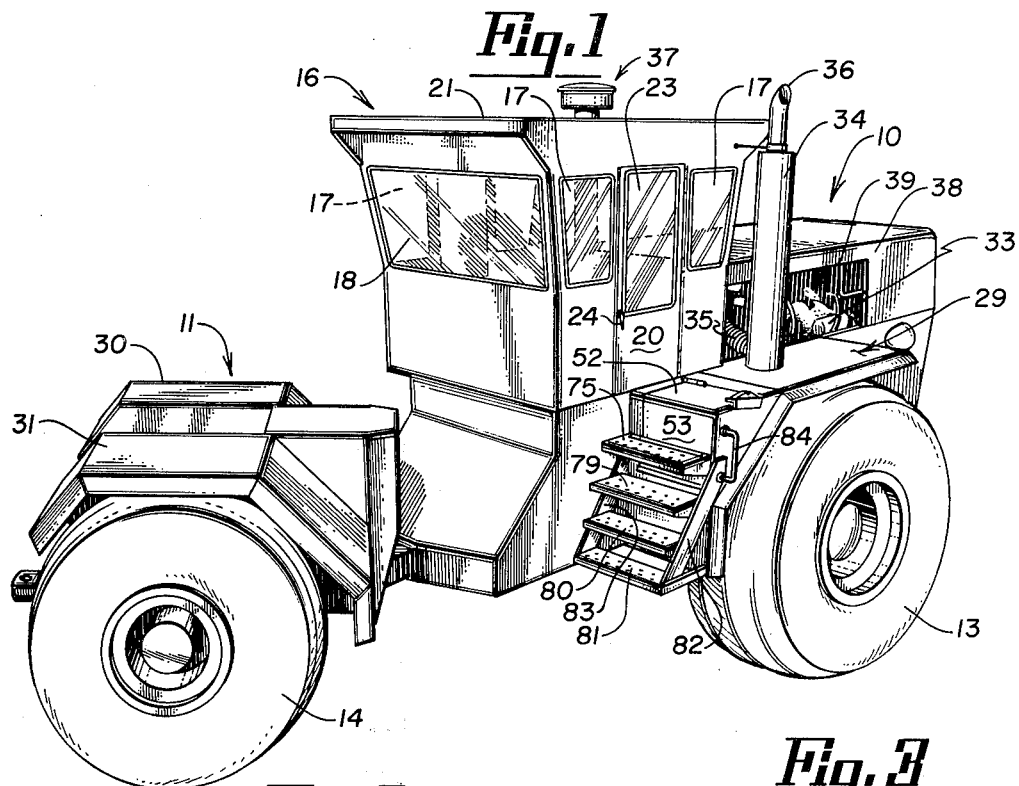

TRACTOR DOOR LATCH

BACKGROUND OF THE INVENTION

Many of the larger tractors in use today have cabs in which the operator sits, these cabs being completely enclosed and often air conditioned. Such cabs are provided with one or more doors which are normally closed during operation. Sometimes, however, when the tractor is being operated without air conditioning, it is desirable for having some means for holding the doors open so as to provide adequate ventilation within the cab. There are numerous other instances in which it is desired to hold the cab door in open position. For example, where the wind is blowing rather strongly and the tractor is stationary, it may still be desirable to have the door open during maintenance so as to provide ready access to the interior of the cab. Various arrangements have been proposed for holding the cab door open. It is desirable that such arrangements provide for more or less automatic latching of the cab door when it is moved to a predetermined position. Furthermore, in order to obtain as much mechanical advantage as possible, it is desirable that the cab door be retained near its outer edge. In some cases, the latch has been nothing more than a means movable to extend over the edge of the door when the door is in its open position. In some such prior devices, it has been necessary for the operator to exert considerable effort to move the latch into latching engagement with the door. Furthermore, the problem of unlatching the door under such conditions becomes more bothersome. It is obviously desirable that the latch be readily released without the operator going to much extra effort.

Some latching arrangements that have been provided have had the drawback that they were in the way of the operator during his normal ingress into or egress out of the cab.

It is obviously desirable that the latch be in a position where it not only firmly retains the cab door in the desired open position but also where it is relatively out of the way of the operator during his normal movement into and out of the cab.

In other cases, friction elements such as wedge elements of resilient material have been employed. These have the drawback that they not only are not positive enough in their action but are also open to the drawback that wear tends to reduce their effectiveness.

SUMMARY OF THE PRESENT INVENTION

The present invention is concerned with a latching arrangement in which the latching member is pivotally mounted on the fender adjacent the outer edge thereof and engages the under side of the door. The fender is preferably of a width comparable to that of the door so that the latching member tends to engage the under side of the door at a point closely adjacent the outer edge thereof.

In the latching device of my invention, the latching member is biased upwardly into latching engagement and has a portion designed to interlock with the under side of the door to maintain the same in open position.

The latching member is disposed so as to extend generally parallel to the outer edge of the fender and is pivotally secured about a pivotal axis extending transverse of this outer edge.

The latching member may have a notch in its upper surface, this notch being of a width somewhat greater than that of the lower edge of the door. The lower edge of the door thus enters into and is retained by the notch when the door is moved over the latching member, without the operator having to manipulate the latching member.

The latching member preferably has a portion engageable by the foot to release the latch so that the operator can readily release the latch, even when sitting in the cab.

The upper surface of the latching member preferably has an inclined surface inclined upwardly from the rear end of the latching member to the rear of the notch. The door thus can move along the inclined edge depressing the latching member against this bias until the lower edge of the door enters the notch.

I may provide two inclined surfaces, one of which extends upwardly from rear outer end of the latching member to the rear edge of the notch and the other of which is inclined downwardly from the front edge of the notch towards the front end of the latching member.

The latching member also may have a flange extending downwardly beside the outer edge of the fender to guide the movement of the latching member as it moves up and down.

The biasing means is preferably located beneath one fender and may have an adjustable stop means associated therewith to limit the upper movement of the latching member so that the rear end always lies beneath the path of travel of the lower edge of the door when the latching member is in its uppermost position.

Other features and objects of the invention will be apparent from a consideration of the accompanying specification, claims and drawing.

BRIEF DESCRIPTION OF THE DRAWING

FIG. 1 is a perspective view of a tractor of the type to which my invention is applied;

FIG. 2 is a perspective view of a portion of the tractor showing the yieldable latch of the present invention and the cab door of the tractor in more detail and on a larger scale than in FIG. 1;

FIG. 3 is a top plan view of a portion of the structure of FIG. 2 showing in dotted lines the cab door in open position and retained by the latch; and FIG. 4 is a sectional view showing the door catch, the section being taken along the line 4—4 of FIG. 3.

DESCRIPTION OF THE PREFERRED EMBODIMENT

Referring first to FIG. 1 which, as previously indicated, is a perspective view of a tractor of the type to which my invention is applied, the vehicle is shown as having a front section 10 and a rear section 11. These two sections are preferably connected together through a pivotal connection which permits relative turning movement of the two sections about a vertical axis. Turning is effected by the use of two hydraulic cylinders on each side of the longitudinal axis, one of which is extended and the other contracted, when turning is desired. Vehicles of this general type are shown in the Steiger et al U.S. Pat. No. 3,270,829 and the Irwin U.S. Pat. No. 3,933,216.

The front section 10 is supported by two wheels, only wheel 13 of which is shown. These wheels are mounted upon an axis, not specifically shown, which is rigidly secured to the frame of the vehicle. The back section is similarly supported by two wheels, only wheel 14 of which is shown. The rear wheels are similarly mounted upon an axle (not shown) rigidly secured to the frame of the back section. The front section 10 has a body portion comprising a frame on which is supported an enclosed operator's cab 16 having a plurality of side windows 17 and a rear window 18. The cab is further provided with a door 20 and a roof 21. The cab 16, in the form shown, tapers outwardly towards the top so that the overall area of the roof 21 is substantially greater than the cross-sectional area of the base of the cab. The door 20, as best shown in FIG. 2, is secured to the cab proper by a plurality of hinges 22, only one of which is shown. The door has a window 23 therein and has a handle 24 for opening and closing the door, the handle being provided with a conventional lock 25.

The front section 10 is provided with a pair of fenders, only one fender 29 of which is visible in the drawing. Similarly, the rear section is provided with a pair of fenders 30 and 31. The fenders 29, 30 and 31 each extend at least partially over the wheels with which they are associated.

It is to be understood that the cab 16 is supported upon a frame of the tractor in a conventional manner. Also supported on the frame is an internal combustion engine 33 which may be of any suitable type such as a Diesel engine. Extending vertically up from the front fender 29 is an exhaust stack 34 connected through a conduit 35 to the exhaust manifold of engine 33. At the upper end of the exhaust stack 34 there is a suitable gas discharge deflector 36. Located on the opposite side of the cab and only partially visible in the drawing is an air intake stack 37. It will be understood that this air intake stack 37 is connected through an air intake pipe and an air cleaner to the intake manifold. The air may pass through a compressor driven by an exhaust gas driven turbo supercharger before entering the intake manifold.

It will be noted that the engine 33 is located within a hood 38 having an opening 39 in the side thereof for enabling access to the engine. It is to be understood that a similar opening is located on the opposite side of the hood.

It will be noted that the front fender 29 has a horizontally extending portion 42, as best shown in FIG. 2, which is bent downwardly at an angle to provide a sloping portion 43 which in turn is bent to provide a vertically extending portion 45. The horizontal portion 42, along with the sloping portion 43 and the vertically extending portion 45, define a wheel cavity in which the wheel 13 is disposed. Secured as by welding to the horizontal extending portion 42 is a further horizontal sheet 48 of metal which, as described in my copending application Ser. No. 746,156, filed of even date herewith and entitled "Self Locking Compartment For Tractors", is bent to form a compartment designed for the reception of tools used in maintenance and repair of the tractor.

A horizontally extending plate 52 of sheet metal is pivotally secured to the horizontal plate 48 by a pair of pivotal connections 59. A pivot pin 57, as best shown in FIG. 4, extends through each pivotal connection. Pivotally secured to the horizontal plate 52 is a vertical plate 53 of sheet metal which is formed at its lower end to engage the adjacent portion of the fender construction. The vertical plate 53 is preferably pivotally secured to the horizontal plate 52 by a pivotal connection. This enables the horizontal plate 52 to be swung about the pivots 59 without swinging out the portion 53. In other words, the portion 53 can be moved substantially vertically to raise the plate 52 and swing it to a position in which the space beneath the plate 52 is uncovered. A support bracket 68 with a safety notch 70 (both shown in dotted lines) is provided for supporting plate 52 when in raised position, as described in my copending application referred to above. Various compartments for tools and the battery can be provided in this space. The tool and battery compartment is automatically locked when the door 20 is locked, since the lower edge of the door 20 extends over the inner curved edge 64 of the flat plate 52. Thus, when the door 20 is in its closed position, as shown in FIGS. 1 and 2, it is impossible to raise the cover plate 52 sufficiently to enable any access to the compartment beneath the cover plate 52. Thus, when the door 20 is closed and locked, the compartment formed between cover plate 52 and vertical plate 53 is locked and it is impossible to gain access to the tools in compartment 46, the battery 65 or any of the tools or accessories in the compartment beneath the battery 65. Furthermore, this is accomplished without the use of an additional lock of any type so that the locking of the door automatically insures that the accessory compartments described above are also locked.

It will be noted that there is secured to the vertical cover plate 53 a step 75 having apertures 78 therethrough to minimize slipping of a foot on the step. The step 75 is one of a series of steps provided to enable ready access to the cab door. The steps are best shown in FIG. 1. The remaining steps 79, 80 and 81 are supported by a pair of inclined beams 82 and 83 which are welded to side plates of the fender, only 54 of which is visible. As will be apparent from FIG. 1, these steps 79, 80 and 81 project progressively further to the rear as is common in connection with steps and are likewise provided with apertures to minimize slippage. While the upper surface of the horizontal cover plate 52 has been shown as smooth, it is to be understood that this surface likewise may be provided with any suitable means to prevent slippage of the foot on the cover plate 52 since in normal use, this acts as the top treadplate upon which the operator steps when leaving or entering the cab. A hand rail 84 is bolted to the side plate 54 and to the rail 82 to aid one in stepping onto the lower step 81. When the cover plate 52 and the vertical cover plate 53 are moved to the position in which access can be had to the accessory compartments, the step 75 is likewise moved. This has the advantage of moving the step 75 out of the way so that it does not interfere with access to the accessory compartment. At the same time, the lower steps 79, 80 and 81 remain in position to enable the operator to stand on a selected one of these steps to facilitate examination of the contents of the accessory compartments.

Referring now to the invention of the present application, a door latch is generally designated by the reference numeral 85. As best shown in FIGS. 2 and 4, this door latch comprises a plate 86 of angular cross section to which is rigidly secured (as by rivets) a triangular vertical plate 87, having notch 88 adjacent the upper apex of the triangle. The angular plate 86 is pivotally mounted on pivot pin 57 of pivot 59. Notch 88 is of a width slightly greater than the thickness of the door 20 so that the lower edge 71 of the door 20 can readily enter this notch 88, as shown in dotted lines in FIG. 3. The angular plate 86 is biased upwardly by a spring 89 which has one end attached to an ear 90 secured to the under side of the cover plate 52. The other end of the spring 89 is secured to the lower end of a stud 91 in the form of a bolt which extends through an aperture 93 in the plate 52 and has its head secured to the under side of the angle plate 86. It will be readily apparent that the spring 89 biases the plate 88 upwardly, the upper movement being limited by the engagement of an adjustable nut 97 with the under side of plate 52. The spring 89 thus acts to bias the latch 85 to the position shown in FIGS. 2 and 4.

It has previously been noted that the vertical plate 87 is triangular. It has two inclined upper edges 94 and 95. Inclined edge 94 slopes upwardly from the rear end of the latching member to the rear edge of the notch 88. The inclined surface 95 slopes downwardly from the forward edge of notch 88 to the forward end of plate 87. The plate 86 has a forwardly extending portion 98 which is adapted to be engaged by the foot of the operator. It was previously noted that plate 86 is of angular cross section. It has a downwardly extending flange 99 (shown in FIG. 2) which extends downwardly parallel to plate 54 and serves to guide the movement of the plate 86. The movement of plate 86, however, is primarily determined by its pivotal connection to the pivot pin of hinge 59.

The adjusting nut 97 is normally adjusted so that the rear end of plate 86 slides beneath the path of the lower edge of door 20 when the door is moved to open position. The lower edge of the door, when moved towards open position, will engage the inclined surface 94, depressing the plate 86 against the action of biasing spring 89. When the door moves to the position shown in dotted lines in FIG. 3, the lower edge of the door will enter the notch 88 and be retained by the notch. Because the lower edge of the door is disposed within the notch 88, it will be obvious that the door is firmly retained in position. When it is desired to release the door, all that it is necessary to do is to step on the outer edge 98 of the angular plate 86, pushing the plate 86 downwardly against the bias of spring 89, thus freeing the door. It is even possible for the operator to do this when still sitting in the tractor seat. In the normal procedure, the operator on entering the cab pushes downwardly on the plate 86 as he enters the cab and pulls the door to closed position as he moves into the cab. If, however, the door is left open after the operator enters the cab, he may still close the door by extending his foot out of the cab and depressing the plate 86 to release the door and then pulling the door to closed position.

It will be noted that when the door is in the dotted line position of FIG. 3, is still overlies the horizontal cover plate 52 so that it is still impossible to obtain access to the accessory compartment. This is the position that the door assumes when the operator is merely desirous of going in or out of the cab 16. When, however, it is desired to obtain access to the accessory compartment 52, the door latch 85 may be depressed so that the door 20 can be swung to a further open position as indicated by the arrow 93. When this happens, the door is entirely clear of the cover plate 52 and the horizontal cover plate 52 and the vertical cover plate 53 can be readily raised about the pivots 59 to a fully open position.

When it is desired to move the door back towards closed position, it will be readily apparent that the door will ride along the inclined surface 95 of the plate 87, depressing the plate 86 against the biasing force of spring 89 until the door enters the notch 88 and is again in the dotted line position of FIG. 3. If, however, it is desired to close the tractor door completely, the plate 86 may be depressed sufficiently to allow the door to fully close.

It will be noted that despite the convenience of operation of the improved latch 85, it is in a position in which it interferes to a minimum with the use of the tractor in the normal manner. Because it is on the same pivot pin as the hinges 59 of the battery and tool compartment cover and swings with it when the compartment is open, the latch in no way interferes with the operation of the compartment cover. Because it is located adjacent the outside edge of the fender, it is relatively out of the way, interfering to a minimum with the use of the stairs and step provided by plate 52. Furthermore, since the width of the plate 52 of the fender is approximately the same as the width of the door 20, as will be noted from FIG. 3, and since the latch 85 is adjacent the outer edge of the fender, the latch grips the door adjacent its outer edge. This gives the latch considerable mechanical advantage over an arrangement in which the latch grips the door at some point intermediate the width thereof.

CONCLUSION

It will be seen that I have provided a tractor door latch which is extremely simple in construction and is very effective. The latch furthermore is located at a point where it impedes the use of the tractor to a minimum. It is secured on the same pivot as a battery compartment cover with which it is associated and is movable out of the way whenever the cover is opened. The latch may be released with a minimum of effort even when the operator is sitting in the cab. The latch holds the door in an intermediate open position, permitting the operator to move freely into and out of the cab but is releasable to permit the door to move to a wider open position, in which position the cover to the battery and tool compartment may be opened.

While I have shown a specific embodiment of my invention, it is to be understood that this is for purposes of illustration only and that the scope of the invention is limited to that of the appended claims.

I claim:
1. In combination:
   a tractor having a tractor frame, a driver's cab and an engine supported on said frame, said driver's cab having an access door movable between open and closed positions, a plurality of wheels supporting said frame, at least some of which are connected to said engine in driven relation thereto, one of said wheels being located beneath and adjacent said access door, a plurality of fenders each extending at least partially over one of said wheels including one fender extending over said one wheel beneath said access door, said fender having a width substantially as great as the width of the access door, and a yieldable latch for said door, said latch comprising;
   a latching member pivotally mounted on said one fender adjacent the outer edge thereof and having an upper surface, and
   means yieldably biasing said latching member upwardly so as to cause said upper surface to move against the under side of said door when said door is opened by at least a predetermined amount, the upper surface of said latching member movable into engagement with the under side of said door having an intermediate latching portion coacting with said door to maintain the same in a substan- tially open position and a further portion movable downwardly against said biasing means to a position in which said door can be moved to a further open position to permit free access to the portion of the fender on which said latching member is located.

2. The combination of claim 1 in which the longitudinal axis of said latching member is generally parallel to the outer edge of the fender and is pivotally secured about a pivotal axis extending generally transversely of said outer edge.

3. The combination of claim 1 in which said latching member has a notch in said intermediate portion of its upper surface, said notch being of a width somewhat greater than that of the lower edge of the door so that the lower edge can enter into and be retained by said notch.

4. The combination of claim 3 in which the upper surface of said latching member has an inclined surface inclined upwardly from the rear end of the latching member to the rear edge of said notch.

5. The combination of claim 3 in which the upper surface of said latching member has a first inclined surface inclined upwardly from the rear end of the latching member to the rear edge of said notch and a second inclined surface inclined downwardly from the front edge of said notch towards the front end of said latching member.

6. The combination of claim 2 in which the latching member has a width relatively small as compared with that of said fender and has a flange extending downwardly beside the outer edge of the fender to guide the movement of the latching member.

7. The combination of claim 1 in which the biasing means is located beneath said one fender.

8. The combination of claim 3 in which the latching member is pivotally mounted adjacent its forward end on said fender and in which the biasing means has adjustable means to limit the upward movement of said latching member such that the rear end lies beneath the path of travel of the lower edge of the door when in its uppermost position.

9. The combination of claim 1 in which said latching member has a rearwardly extending portion designed to be engaged by a foot to depress the latch and release the same.

* * * * *